US 12,545,419 B1

(12) United States Patent
Ricci et al.

(10) Patent No.: US 12,545,419 B1
(45) Date of Patent: Feb. 10, 2026

(54) EMERGENCY ENERGY PROTECTION ASSEMBLY FOR HYBRID-ELECTRIC AIRCRAFT PROPULSION SYSTEMS

(71) Applicant: Pratt & Whitney Canada Corp., Longueuil (CA)

(72) Inventors: Thomas Trevor Ricci, Pointe-Claire (CA); Michael Hanna, Beaconsfield (CA); Remi Robache, Montreal (CA); Antwan Shenouda, Mississauga (CA); Raphael Gariepy, Montreal (CA); Fraz Ahmad Kharal, Brampton (CA); Ezzat Meshkinfam, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/005,521

(22) Filed: Dec. 30, 2024

(51) Int. Cl.
*B64D 31/09* (2024.01)
*B64D 27/33* (2024.01)
*B64D 31/18* (2024.01)

(52) U.S. Cl.
CPC ............ *B64D 31/09* (2024.01); *B64D 27/33* (2024.01); *B64D 31/18* (2024.01)

(58) Field of Classification Search
CPC ........ B64D 27/30; B64D 27/33; B64D 31/06; B64D 31/09; B64D 31/12; B64D 31/16; B64D 31/18; B64D 35/02; B64D 35/021; B64D 35/022; B64D 35/026
USPC ...................................................... 244/53 R
See application file for complete search history.

(56) References Cited

U.S. PATENT DOCUMENTS

| | | | |
|---|---|---|---|
| 7,043,896 B2 * | 5/2006 | Matthews | ............... G05B 9/03 |
| | | | 60/39.091 |
| 11,273,927 B2 * | 3/2022 | Dittmar | ............... F02D 41/021 |
| 11,486,318 B2 | 11/2022 | Zaccaria | |
| 11,597,526 B2 | 3/2023 | Mark | |
| 11,649,038 B2 | 5/2023 | Michael | |
| 11,691,517 B1 | 7/2023 | Lohe | |
| 11,878,594 B2 | 1/2024 | Khozikov | |
| 12,028,009 B2 | 7/2024 | Lacaux | |
| 2020/0277064 A1 * | 9/2020 | Thomassin | ........... H02P 29/028 |
| 2020/0277078 A1 * | 9/2020 | Smith | .................... B64D 27/31 |
| 2021/0354837 A1 * | 11/2021 | Mark | .................... H02H 7/0833 |
| 2022/0297846 A1 * | 9/2022 | Mark | ..................... B60L 50/61 |
| 2024/0113513 A1 | 4/2024 | Syed | |

(Continued)

*Primary Examiner* — Joshua E Rodden
(74) *Attorney, Agent, or Firm* — Getz Balich LLC (57) ABSTRACT

A propulsion system includes a propulsor, an engine, an electrical assembly, and an emergency energy protection assembly. The engine includes a fuel system. The fuel system includes a fuel control unit. The electrical assembly includes a battery, a motor control unit, an electric motor, and an electrical distribution system. The electrical distribution system includes at least one contactor electrically connected between the battery and the motor control unit. The at least one contactor is switchable between a closed state and an open state. The engine and the electric motor are coupled with the propulsor. The emergency energy protection assembly includes an emergency actuator. The emergency actuator is actuable in an actuated state to control the at least one contactor to switch to the open state, control the motor control unit to deenergize the electric motor, and control the fuel control unit to stop fuel flow for the engine.

19 Claims, 4 Drawing Sheets

(56) References Cited

U.S. PATENT DOCUMENTS

2024/0308350 A1     9/2024   Gariepy
2024/0425187 A1*   12/2024   Gharagozloo ......... B64D 31/10

* cited by examiner

EMERGENCY ENERGY PROTECTION ASSEMBLY FOR HYBRID-ELECTRIC AIRCRAFT PROPULSION SYSTEMS

TECHNICAL FIELD

This disclosure relates generally to hybrid-electric aircraft propulsion systems and, more particularly, to emergency energy protection assemblies for hybrid-electric aircraft propulsion systems.

BACKGROUND OF THE ART

Hybrid-electric propulsion systems for aircraft may typically include multiple high-energy systems, such as jet fuel systems and high-voltage electrical systems, used to facilitate propulsion. Various systems and methods for controlling and providing protective functions for these hybrid-electric aircraft propulsion systems are known. While these known systems and methods may be suitable for their intended purposes, there is always room in the art for improvement.

SUMMARY

According to an aspect of the present disclosure, a propulsion system for an aircraft includes a propulsor, an engine, an electrical assembly, and an emergency energy protection assembly. The engine includes an engine output shaft, a combustor, and a fuel system. The engine output shaft is coupled with the propulsor. The fuel system is connected in fluid communication with the combustor. The fuel system includes a fuel control unit operable to control fuel flow from the fuel system to the combustor. The electrical assembly includes a battery, a motor control unit, an electric motor, and an electrical distribution system. The electrical distribution system is configured to electrically interconnect the battery and the motor control unit. The electrical distribution system includes at least one contactor electrically connected between the battery and the motor control unit. The at least one contactor is switchable between a closed state and an open state. The motor control unit is electrically connected with the electric motor. The electric motor is coupled with the propulsor. The emergency energy protection assembly includes an emergency actuator. The emergency actuator is connected in signal communication with the at least one contactor, the motor control unit, and the fuel control unit. The emergency actuator is actuable from an unactuated state to an actuated state. The emergency actuator in the actuated state is operable to generate and transmit an emergency control signal to each of the at least one contactor, the motor control unit, and the fuel control unit to respectively control the at least one contactor to switch to the open state, control the motor control unit to deenergize the electric motor, and control the fuel control unit to stop fuel flow through the fuel system to the combustor.

In any of the aspects or embodiments described above and herein, the propulsion system may further include a mechanical disconnect assembly configured to selectively couple the electric motor with the propulsor, the emergency actuator may be further connected in signal communication with the mechanical disconnect assembly, and the emergency actuator in the actuated state may be operable to further generate and transmit the emergency control signal to the mechanical disconnect assembly to control the mechanical disconnect assembly to decouple the electric motor from the propulsor.

In any of the aspects or embodiments described above and herein, the propulsion system may further include a gear box configured to couple the engine output shaft and the electric motor with the propulsor, and the mechanical disconnect assembly may be configured to selectively couple the electric motor with the gear box.

In any of the aspects or embodiments described above and herein, the electrical assembly may further include a battery management system, the battery management system may include a battery management system (BMS) controller connected in signal communication with the at least one contactor, and the BMS controller may be operable to generate and transmit a BMS open control signal or a BMS close control signal to the at least one contactor.

In any of the aspects or embodiments described above and herein, the emergency control signal generated and transmitted to the at least one contactor from the emergency actuator in the actuated state may control the at least one contactor to switch to the open state with the BMS close control signal applied to the at least one contactor by the BMS controller.

In any of the aspects or embodiments described above and herein, the propulsion system may further include an engine controller connected in signal communication with the at least one contactor and the motor control unit, the engine controller may be operable to generate and transmit a motor open control signal or a motor close control signal to the at least one contactor and, with the at least one contactor in the closed state, control the motor control unit to supply electrical power from the battery to the electric motor.

In any of the aspects or embodiments described above and herein, the emergency control signal generated and transmitted to the at least one contactor from the emergency actuator in the actuated state may control the at least one contactor to switch to the open state with the motor close control signal applied to the at least one contactor by the engine controller.

In any of the aspects or embodiments described above and herein, the emergency energy protection assembly may further include a deenergization circuit at the motor control unit, the deenergization circuit may be connected in signal communication with the emergency actuator, the deenergization circuit may be operable to receive the emergency control signal from the emergency actuator in the actuated state and, in response to receiving the emergency control signal, control the motor control unit to deenergize the electric motor.

In any of the aspects or embodiments described above and herein, the at least one contactor may include a battery contactor and an electric motor contactor, the battery contactor may be electrically connected with and between the battery and the electric motor contactor, the electric motor contactor may be electrically connected with and between the battery contactor and the motor control unit, the electrical assembly may further include a battery management system, and the battery management system may include a battery management system (BMS) controller connected in signal communication with the battery contactor. The propulsion system may further include an engine controller connected in signal communication with the electric motor contactor and the motor control unit.

According to another aspect of the present disclosure, a propulsion system for an aircraft includes a propulsor, an engine, an electrical assembly, and an emergency energy protection assembly. The engine includes an engine output shaft, a combustor, and a fuel system. The engine output shaft is coupled with the propulsor. The fuel system is connected in fluid communication with the combustor. The fuel system includes a fuel control unit operable to control fuel flow from the fuel system to the combustor. The electrical assembly includes a battery, a motor control unit, an electric motor, and an electrical distribution system. The electrical distribution system is configured to electrically interconnect the battery and the motor control unit. The electrical distribution system includes at least one contactor electrically connected between the battery and the motor control unit. The at least one contactor is switchable between a closed state and an open state. The motor control unit is electrically connected with the electric motor. The electric motor is coupled with the propulsor. The emergency energy protection assembly includes an emergency actuator. The emergency actuator is connected in signal communication with the at least one contactor, the motor control unit, and the fuel control unit. The emergency actuator is actuable from an unactuated state to an actuated state. The emergency actuator in the actuated state is operable to generate and transmit an emergency control signal to each of the at least one contactor, the motor control unit, and the fuel control unit to respectively control the at least one contactor to switch to the open state, control the motor control unit to deenergize the electric motor, and control the fuel control unit to stop fuel flow through the fuel system to the combustor.

In any of the aspects or embodiments described above and herein, the propulsion system may further include an engine controller connected in signal communication with the at least one contactor and the motor control unit, the engine controller may be operable to generate and transmit a motor open control signal or a motor close control signal to the at least one contactor and, with the at least one contactor in the closed state, control the motor control unit to supply electrical power from the battery to the electric motor.

In any of the aspects or embodiments described above and herein, the emergency control signal generated and transmitted to the at least one contactor from the emergency actuator in the actuated state may control the at least one contactor to switch to the open state with the motor close control signal applied to the at least one contactor by the engine controller.

In any of the aspects or embodiments described above and herein, the emergency energy protection assembly may further include deenergization circuit at the motor control unit, the deenergization circuit may be connected in signal communication with the emergency actuator, the deenergization circuit may be operable to receive the emergency control signal from the emergency actuator in the actuated state and, in response to receiving the emergency control signal, control the motor control unit to deenergize the electric motor.

In any of the aspects or embodiments described above and herein, the propulsion system may further include a mechanical disconnect assembly configured to selectively couple the electric motor with the propulsor, the emergency actuator may be further connected in signal communication with the mechanical disconnect assembly, and the emergency actuator in the actuated state may be operable to further generate and transmit the emergency control signal to the mechanical disconnect assembly to control the mechanical disconnect assembly to decouple the electric motor from the propulsor.

In any of the aspects or embodiments described above and herein, the propulsion system may further include a gear box configured to couple the engine output shaft and the electric motor with the propulsor, and the mechanical disconnect assembly may be configured to selectively couple the electric motor with the gear box.

According to another aspect of the present disclosure, a propulsion system for an aircraft includes a propulsor, an engine, an electrical assembly, and an emergency energy protection assembly. The engine includes a rotational assembly, a gear box, a combustor, and a fuel system. The rotational assembly includes a bladed turbine rotor and a shaft connected to the bladed turbine rotor. The shaft is coupled with the propulsor by the gear box. The fuel system is connected in fluid communication with the combustor. The fuel system includes a fuel control unit operable to control fuel flow from the fuel system to the combustor to drive rotation of the rotational assembly. The electrical assembly includes a battery, a motor control unit, an electric motor, and an electrical distribution system. The electrical distribution system is configured to electrically interconnect the battery and the motor control unit. The electrical distribution system includes at least one contactor electrically connected between the battery and the motor control unit. The at least one contactor is switchable between a closed state and an open state. The motor control unit is electrically connected with the electric motor. The electric motor is coupled with the propulsor. The emergency energy protection assembly includes an emergency actuator. The emergency actuator is connected in signal communication with the at least one contactor, the motor control unit, and the fuel control unit. The emergency actuator is actuable from an unactuated state to an actuated state. The emergency actuator in the actuated state is operable to generate and transmit an emergency control signal to each of the at least one contactor, the motor control unit, and the fuel control unit to respectively control the at least one contactor to switch to the open state, control the motor control unit to deenergize the electric motor, and control the fuel control unit to stop fuel flow through the fuel system to the combustor.

In any of the aspects or embodiments described above and herein, the propulsion system may further include a mechanical disconnect assembly configured to selectively couple the electric motor with the gear box, the emergency actuator may be further connected in signal communication with the mechanical disconnect assembly, and the emergency actuator in the actuated state may be operable to further generate and transmit the emergency control signal to the mechanical disconnect assembly to control the mechanical disconnect assembly to decouple the electric motor from the gear box.

In any of the aspects or embodiments described above and herein, the electrical assembly may further include a battery management system, the battery management system may include a battery management system (BMS) controller connected in signal communication with the at least one contactor, the BMS controller may be to generate and transmit a BMS open control signal or a BMS close control signal to the at least one contactor.

In any of the aspects or embodiments described above and herein, the propulsion system may further include an engine controller connected in signal communication with the at least one contactor and the motor control unit, the engine controller may be operable to generate and transmit a motor open control signal or a motor close control signal to the at least one contactor and, with the at least one contactor in the closed state, control the motor control unit to supply electrical power from the battery to the electric motor.

In any of the aspects or embodiments described above and herein, the emergency energy protection assembly may further include deenergization circuit at the motor control unit, the deenergization circuit may be connected in signal communication with the emergency actuator, the deenergization circuit may be operable to receive the emergency control signal from the emergency actuator in the actuated state and, in response to receiving the emergency control signal, control the motor control unit to deenergize the electric motor.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
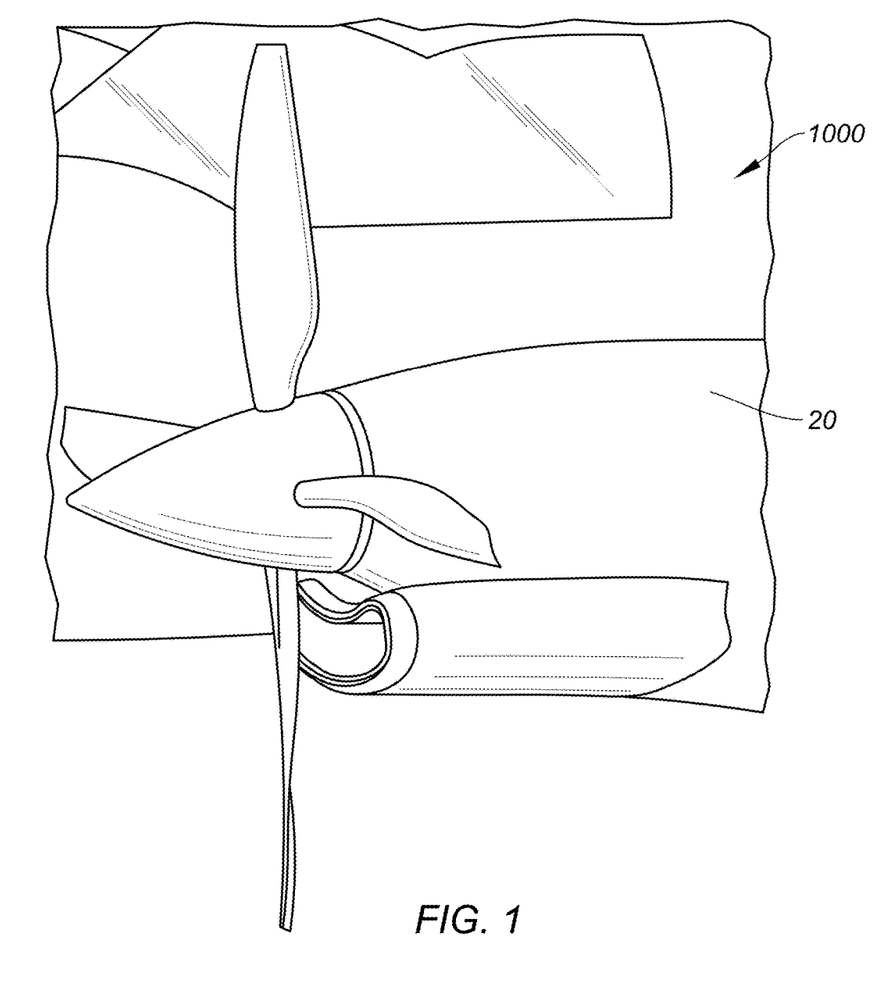
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
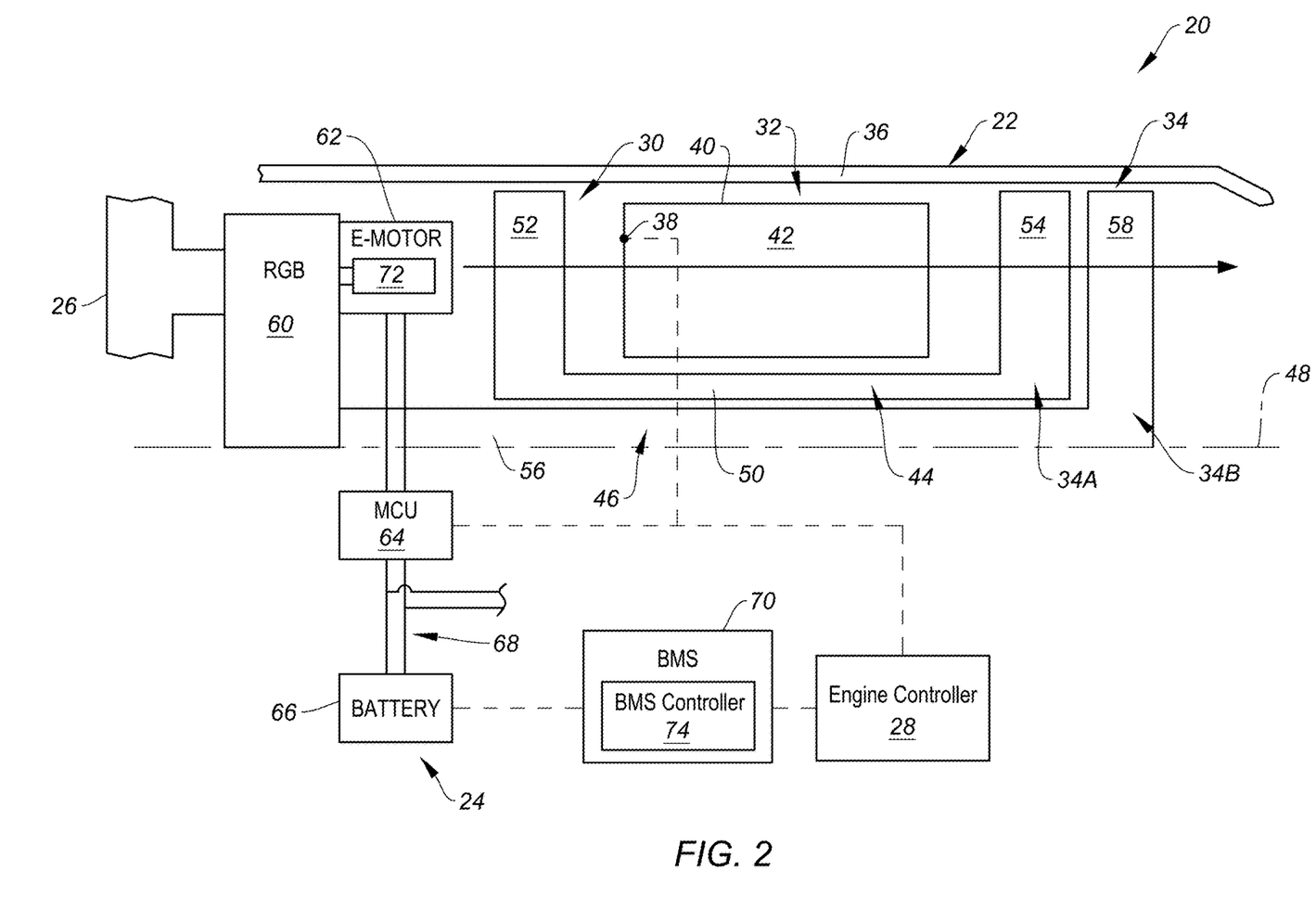
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, an electrical assembly 24, a propulsor 26, and an engine controller 28. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines (e.g., aircraft powerplants) which are not part of a propulsion system, for example, an engine for an auxiliary power unit (APU).

The engine 22 of FIG. 2 includes a compressor section 30, a combustor section 32, a turbine section 34, and an engine static structure 36. The combustor section 32 includes a fuel system 38, a combustor 40 (e.g., an annular combustor). The fuel system 38 is configured to store, direct, and meter a fuel flow to the combustor 40. For example, the fuel system 38 may include fuel tanks, fuel pumps, fuel lines, manifolds, injector nozzles, and the like. The fuel system 38 may additionally include a fuel control unit (FCU) configured to precisely regulate fuel flow through the fuel system 38 to the combustor 40. The combustor 40 forms a combustion chamber 42. The turbine section 34 includes a high-pressure turbine 34A and a power turbine 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed first turbine rotor 54 for the high-pressure turbine 34A. The first shaft 50 interconnects the bladed compressor rotor 52 and the bladed first turbine rotor 54.

The second rotational assembly 46 of FIG. 2 includes a second shaft 56 and a bladed second turbine rotor 58 for the power turbine 34B. The second shaft 56 is connected to the bladed second turbine rotor 58. The second shaft 56 operably connects (e.g., directly or indirectly connects) the bladed second turbine rotor 58 with the propulsor 26. For example, the second shaft 56 of FIG. 2 is coupled with the propulsor 26 by a gear box 60 (e.g., a reduction gear box (RGB)). The gear box 60 includes a gear assembly (e.g., an epicyclic gear assembly) coupling the second shaft 56 and the propulsor 26. The gear assembly may be a reduction gear assembly configured to drive rotation of the propulsor 26 at a reduced rotational speed relative to the second shaft 56. Of course, the second shaft 56 may alternatively be directly connected to the propulsor 26 to drive the propulsor 26 at the same rotational speed as the second shaft 56.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46.

The electrical assembly 24 of FIG. 2 includes an electric motor 62, a motor control unit (MCU) 64, a battery 66, an electrical distribution system 68, and a battery management system (BMS) 70. The electric motor 62 includes a rotor 72. The rotor 72 is coupled to the propulsor 26 by the gear box 60. For example, the gear box 60 may couple both of the second shaft 56 and the rotor 72 to the propulsor 26 to facilitate driving rotation of the propulsor 26 with the bladed second turbine rotor 58 (e.g., via the second shaft 56), the electric motor 62 (e.g., the rotor 72), or a combination of the bladed second turbine rotor 58 and the electric motor 62. The motor control unit 64 is electrically connected with and between the electric motor 62 and the electrical distribution system 68. The motor control unit 64 is configured to control electric power characteristics (e.g., frequency, voltage, current) supplied to the electric motor 62 (e.g., windings of the electric motor 62), for example, to control a rotation speed and/or torque of the rotor 72. The battery 66 is electrically connected to the electrical distribution system 68. The battery 66 is configured to selectively supply electrical power to the electrical distribution system 68 independently (e.g., as a single power source for the electrical assembly 24) or in combination with one or more other electrical power sources (e.g., an electrical generator). The battery 66 may include a plurality of battery strings, battery sub-strings, battery modules, battery cells, and/or the like electrically connected together in series and/or parallel as necessary to configure the battery 66 with the desired electrical characteristics (e.g., voltage output, current output, storage capacity, etc.) for the aircraft 1000. The present disclosure is not limited to any particular configuration of the battery 64. The battery 66 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The electrical distribution system 68 electrically interconnects components of the electrical assembly 24. The electrical distribution system 68 includes switchgear, cables, wires, breakers, switches, contactors, electrical power conditional and/or conversion (e.g., AC to DC or DC to AC conversion) components, and/or other electrical components to effect the transfer of electrical power between components of the electrical assembly 24. The electrical distribution system 68 may additionally be electrically connected with other electric power sources (e.g., an electrical generator) of the electrical assembly 24. The electrical distribution system 68 may additionally include one or more electrical power controllers, for example, to control a magnitude and/or direction of electrical current flow to components of the electrical assembly 24. The battery management system 70 includes a battery management system (BMS) controller 74.

The engine controller 28 is connected in signal communication with the fuel system 38 (e.g., the fuel system fuel control unit) and the motor control unit 64. The engine controller 28 is configured to control operating parameters of the engine 22 such as, but not limited to, fuel flow to the combustor 40, stator vane position (e.g., variable compressor inlet guide vane (IGV) position), compressor air bleed valve position, shaft (e.g., first shaft 50 and/or second shaft 56) torque and/or rotation speed, etc. so as to control an engine power or performance of the propulsion system 20. For example, the engine controller 28 may control the fuel system 38 to modulate fuel flow to the combustor 40 and/or control the motor control unit 64 to operate the electric motor 62 at a target rotation speed and/or torque or to deenergize the electric motor 62. In some embodiments, the engine controller 28 may be part of a full authority digital engine control (FADEC) system for the propulsion system 20 and its engine 22.

Figure 3:
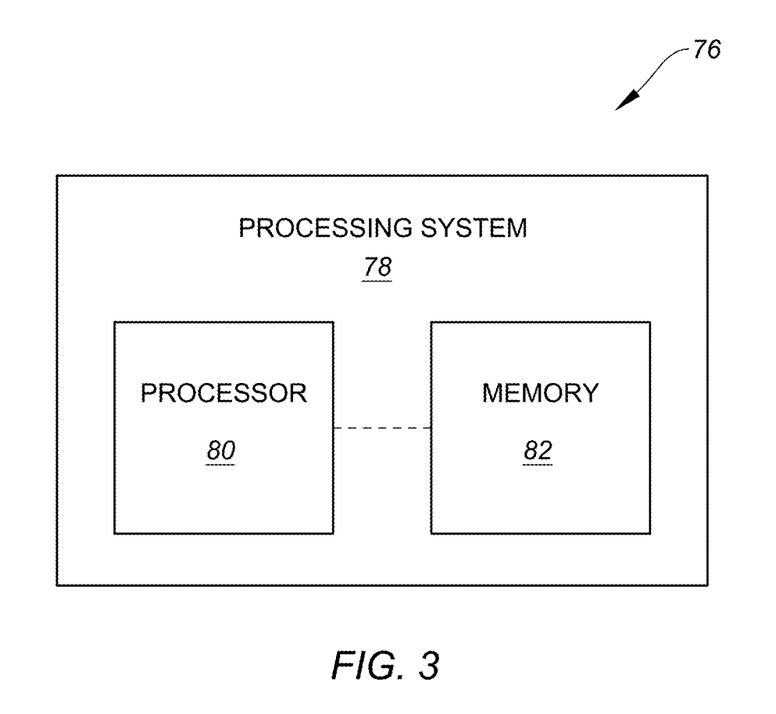
FIG. 3 schematically a control channel for a controller of the aircraft propulsion system, in accordance with one or more embodiments of the present disclosure.

Referring briefly to FIG. 3, the engine controller 28 and the BMS controller 74 each include at least one control channel 76. Each control channel 76 includes a discrete processing system 78. The processing system 78 includes a processor 80 connected in signal communication with memory 82. The processor 80 may include any type of computing device, computational circuit, processor(s), central processing unit (CPU), graphics processing unit (GPU), computer, or the like capable of executing a series of instructions that are stored in memory 82. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the control channel 76 (e.g., of the engine controller 28 or the BMS controller 74) to accomplish the same algorithmically and/or coordination of electrical assembly 24 components. The memory 82 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the engine controller 28 or the BMS controller 74. The processing system 78 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the processing system 78 and external electrical or electronic devices may be via a hardwire connection or via a wireless connection. A person of skill in the art will recognize that portions of the processing system 78 may assume various forms (e.g., digital signal processor, analog device, etc.).

During operation of the propulsion system 20 of FIG. 2, ambient air enters the propulsion system 20 through an air intake into and through a core flow path of the engine 22. The ambient air flow along the core flow path is compressed in the compressor section 30, by rotation of the bladed compressor rotor 52, and directed into the combustor 40. Fuel injected by the fuel system 38 into the combustor 40 is mixed with the compressed air to provide a fuel-air mixture. This fuel-air mixture is combusted in the combustion chamber 42, and the resultant combustion gas is directed through the high-pressure turbine 34A and the power turbine 34B and subsequently exhausted from the propulsion system 20. The bladed first turbine rotor 54 and the bladed second turbine rotor 58 rotationally drive the first rotational assembly 44 and the second rotational assembly 46, respectively, in response to the combustion gas flow through the high-pressure turbine 34A and the power turbine 34B. The second rotational assembly 46 (e.g., the second shaft 56) may drive rotation of the propulsor 26, for example, through the gear box 60. The electric motor 62 may be selectively operated (e.g., by the engine controller 28) to drive rotation of the propulsor 26 independently or in combination with the engine 22 through the gear box 60.

Hybrid-electric propulsion systems for aircraft, such as the propulsion system 20, may include batteries and high-voltage electric systems configured to facilitate electric propulsion. Hybrid-electric propulsion systems may also use highly flammable aviation fuels (e.g., kerosene-based fuels). While these high-energy electrical and fuel systems facilitate effective propulsion, they may be dangerous in the rare event of an emergency such as, but not limited to, a fire at the propulsion system 20 or the aircraft 1000.

Figure 4:
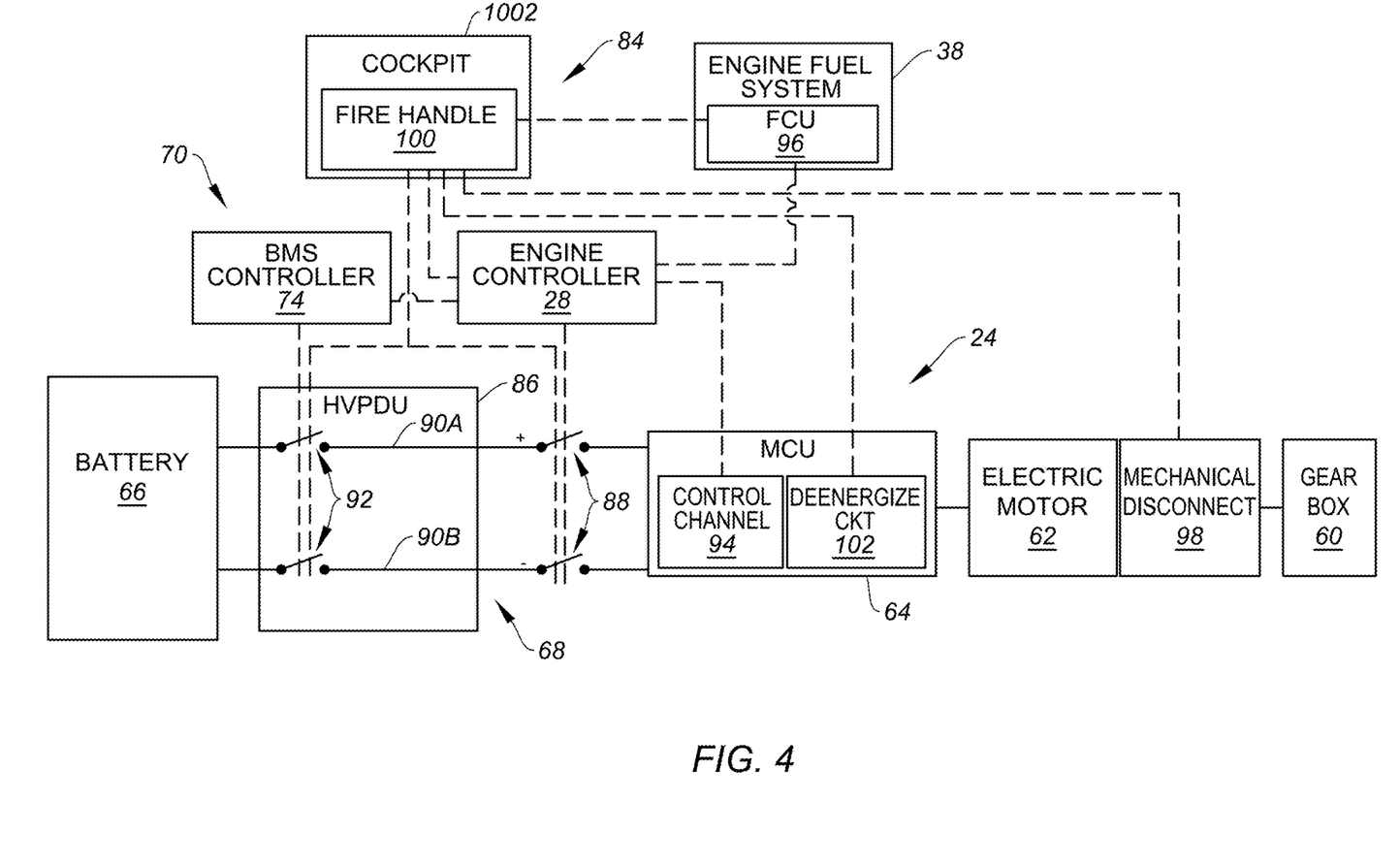
FIG. 4 schematically illustrates portions of the aircraft propulsion system including an electrical assembly, a fuel system, and an emergency energy protection assembly, in accordance with one or more embodiments of the present disclosure.

Referring to FIG. 4, the propulsion system 20 further includes an emergency energy protection assembly 84. FIG. 4 schematically illustrates the electrical assembly 24, the fuel system 38, and the emergency energy protection assembly 84.

The electrical distribution system 68 of FIG. 4 includes a high-voltage power distribution unit (HVPDU) 86 and one or more electric motor contactors 88. The HVPDU 86 includes a positive battery line 90A, a negative battery line 90B, and one or more battery contactors 92. The HVPDU 86 includes the battery contactors 92 on the positive battery line 90A and the negative battery line 90B to facilitate selective control of electrical current flow through the HVPDU 86 and electrical isolation of the battery 66 or subdivisions of the battery 66 (e.g., battery strings). The present disclosure, however, is not limited to the foregoing exemplary configuration of the HVPDU 86 of FIG. 4, and the HVPDU 86 may alternatively include different arrangements of the battery contactors 92 or other electrical interruption devices (e.g., switches, breakers, etc.), subdivisions of the battery 66 (e.g., parallel battery strings), and the like. The electric motor contactors 88 of FIG. 4 are electrically connected with and between the HVPDU 86 (e.g., the positive battery line 90A and the negative battery line 90B) and the motor control unit 64 to facilitate selective energization or deenergization of the electric motor 62. The contactors 88, 92 are selectively configurable (e.g., switchable) in and between a closed state or an open state to conduct or interrupt an electrical current flow, respectively. The contactors 88, 92 may include electrically controlled relays or switches which may be controlled by an electrical control signal to position the respective contactors in the open state or the closed state.

The engine controller 28 is connected in signal communication with the electric motor contactors 88. The engine controller 28 is configured to control (e.g., position) the electric motor contactors 88 in their respective closed states and open states to energize or deenergize the electric motor 62. The BMS controller 74 is connected in signal communication with the battery contactors 92. The BMS controller 74 is configured to control (e.g., position) the battery contactors 92 in their respective closed states and open states to energize or deenergize the electric motor 62 and/or other electrical loads, or to facilitate electrical isolation of the battery 66 or subdivisions (e.g., battery strings) of the battery 66.

The motor control unit 64 of FIG. 4 includes an MCU control channel 94. The MCU control channel 94 of FIG. 4 is connected in signal communication with the engine controller 28 (e.g., one or more of the control channels 76 of the engine controller 28). The MCU control channel 94 is operable to receive a motor control signal output (e.g., a target electric motor 62 rotation speed and/or torque) from the engine controller 28 and, in response to the received motor control signal output, control the motor control unit 64 to supply electrical power to the electric motor 62 with electric power characteristics (e.g., frequency, voltage, current) consistent with the motor control signal output of the engine controller 28 (including deenergizing the electric motor 62). For example, the MCU control channel 94 may include or otherwise be formed by a digital signal processor (DSP) circuit operable to control the motor control unit 64 to supply electrical power to the electric motor 62 with electric power characteristics (e.g., frequency, voltage, current) consistent with the motor control signal output of the engine controller 28.

The fuel system 38 of FIG. 4 includes a fuel control unit 96. The fuel control unit 96 is configured to precisely regulate fuel flow through the fuel system 38 to the combustor 40 (see FIG. 2). The fuel control unit 96 of FIG. 4 is connected in signal communication with the engine controller 28 (e.g., one or more of the control channels 76 of the engine controller 28). The fuel control unit 96 is operable to receive a fuel control signal output (e.g., a target fuel flow rate) from the engine controller 28 and, in response to the received fuel control signal output, control a fuel flow to the combustor 40 consistent with the fuel control signal output of the engine controller 28.

The propulsion system 20 may additionally include a mechanical disconnect assembly 98 at the electric motor 62. The mechanical disconnect assembly 98 is configured to selectively couple and decouple the electric motor 62 (e.g., the rotor 72) with the propulsor 26 (and the second shaft 56) through the gear box 60.

The emergency energy protection assembly 84 of FIG. 4 includes an emergency actuator 100 (sometimes referred to as a "fire handle," a "fire switch," or a "kill switch") and a deenergization circuit 102. The emergency actuator 100 may typically be disposed at a cockpit 1002 of the aircraft 1000 where it can be quickly accessed and operated by a pilot or other operator in the event of an emergency (e.g., a fire) requiring isolation of propulsion system 20 and aircraft 1000 energy sources. The emergency actuator 100 is actuable between an unactuated state (e.g., a first position) and an actuated state (e.g., a second position). The emergency actuator 100 may include a mechanical lever which, when actuated (e.g., positioned to or otherwise configured in the actuated state), causes the emergency actuator 100 to transmit one or more emergency control signals to components of the propulsion system 20, the electrical assembly 24, the fuel system 38, and the emergency energy protection assembly 84.

The emergency actuator 100 is connected in signal communication with the deenergization circuit 102. The deenergization circuit 102 is operable to control the motor control unit 64 to isolate electrical power from (e.g., deenergize) the electric motor 62. The deenergization circuit 102 is operable to control the motor control unit 64 to deenergize the electric motor 62 independent of the MCU control channel 94 or any motor control signal output from the engine controller 28 to the MCU control channel 94. In other words, the deenergization circuit 102 may override the MCU control channel 94, in response to an emergency control signal from the emergency actuator 100, to control the motor control unit 64 to deenergize the electric motor 62. For example, the deenergization circuit 102 may include a field-programmable gate array (FPGA) circuit configured to receive the emergency control signal from the emergency actuator 100 and, in response, control the motor control unit 64 to deenergize the electric motor 62. The emergency actuator 100 is further connected in signal communication with the electric motor contactors 88, the battery contactors 92, and the fuel control unit 96. The emergency actuator 100 may be further connected in signal communication with the mechanical disconnect assembly 98.

Upon actuation (e.g., by a pilot), the emergency actuator 100 transmits emergency control signals to the electric motor contactors 88, the battery contactors 92, the fuel control unit 96, and the deenergization circuit 102. The emergency actuator 100 may additionally transmit the emergency control signals to the mechanical disconnect assembly 98. The emergency actuator 100 is operable to generate and transmit the emergency control signals (e.g., an open control signal) to the battery contactors 92 to control (e.g., switch) the battery contactors 92 in their respective open states to electrically isolate the battery 66. The open control signal from the emergency actuator 100 may cause the battery contactors 92 to switch from their closed states to their open states independent of any control signal (e.g., a close control signal) from the BMS controller 74 to the battery contactors 92. Similarly, the emergency actuator 100 is operable to generate and transmit the emergency control signals (e.g., an open control signal) to the electric motor contactors 88 to control (e.g., switch) the electric motor contactors 88 in their respective open states to electrically isolate the electric motor 62 (e.g., from the HVPDU 86). The open control signal from the emergency actuator 100 may cause the electric motor contactors 88 to switch from their closed states to their open states independent of any control signal (e.g., a close control signal) from the engine controller 28 to the electric motor contactors 88. The emergency actuator 100 is operable to generate and transmit the emergency control signals (e.g., a shutdown control signal) to the fuel control unit 96 to control the fuel control unit 96 to stop fuel flow to the combustor 40, thereby shutting down the engine 22. Similarly, the emergency actuator 100 is operable to generate and transmit the emergency control signals (e.g., a shutdown control signal) to the deenergization circuit 102, causing the deenergization circuit 96 to control the motor control unit 64 to deenergize the electric motor 62. The emergency control signals from the emergency actuator 100 may override any control signal output from the engine controller 28 for controlling operation of the fuel control unit 96 and/or the motor control unit 64, to facilitate engine 22 and electric motor 62 shutdown independent of the engine controller 28. The emergency actuator 100 is operable to generate and transmit the emergency control signals (e.g., a disconnect control signal) to the mechanical disconnect assembly 98, thereby controlling the mechanical disconnect assembly 98 to decouple the electric motor 62 (e.g., the rotor 72) from the gear box 60. Decoupling of the electric motor 62 from the gear box 60 may prevent the engine 22 (e.g., the second rotational assembly 46) from driving rotation of the electric motor 62 (e.g., the rotor 72) as the second rotational assembly 46 spins down following actuation of the emergency actuator 100, thereby preventing or minimizing electrical generation by the electric motor 62.

The present disclosure emergency energy protection assembly 84 facilitates deenergization and electrical isolation of high-energy electrical and fuel systems of the propulsion system 20 and the aircraft 1000 independent of the electronic control systems (e.g., the engine controller 28 and the BMS controller 74) used to control normal operations of the engine 22 and the electrical system 24 to facilitate propulsion using the propulsion system 20. Accordingly, the emergency energy protection assembly 84 facilitates rapid, reliable, and parallel deenergization and electrical isolation of high-energy electrical and fuel systems under emergency conditions.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:
   a propulsor;
   an engine including an engine output shaft, a combustor, and a fuel system, the engine output shaft coupled with the propulsor, the fuel system connected in fluid communication with the combustor, the fuel system including a fuel control unit operable to control fuel flow from the fuel system to the combustor;
   an electrical assembly including a battery, a motor control unit, an electric motor, an electrical distribution system, and a battery management system, the electrical distribution system configured to electrically interconnect the battery and the motor control unit, the electrical distribution system including at least one contactor electrically connected between the battery and the motor control unit, the at least one contactor switchable between a closed state and an open state, the at least one contactor including a battery contactor and an electric motor contactor, the battery contactor electrically connected with and between the battery and the electric motor contactor, the electric motor contactor electrically connected with and between the battery contactor and the motor control unit, the motor control unit electrically connected with the electric motor, the electric motor coupled with the propulsor, the battery management system including a battery management system (BMS) controller connected in signal communication with the battery contactor;
   an emergency energy protection assembly including an emergency actuator, the emergency actuator connected in signal communication with the at least one contactor, the motor control unit, and the fuel control unit, the emergency actuator actuable from an unactuated state to an actuated state, the emergency actuator in the actuated state operable to generate and transmit an emergency control signal to each of the at least one contactor, the motor control unit, and the fuel control unit to respectively control the at least one contactor to switch to the open state, control the motor control unit to deenergize the electric motor, and control the fuel control unit to stop fuel flow through the fuel system to the combustor; and
   an engine controller connected in signal communication with the electric motor contactor and the motor control unit.

2. The propulsion system of claim 1, further comprising a mechanical disconnect assembly configured to selectively couple the electric motor with the propulsor, wherein the emergency actuator is further connected in signal communication with the mechanical disconnect assembly, and the emergency actuator in the actuated state is operable to further generate and transmit the emergency control signal to the mechanical disconnect assembly to control the mechanical disconnect assembly to decouple the electric motor from the propulsor.

3. The propulsion system of claim 2, further comprising a gear box configured to couple the engine output shaft and the electric motor with the propulsor, and the mechanical disconnect assembly is configured to selectively couple the electric motor with the gear box.

4. The propulsion system of claim 1, wherein the BMS controller is operable to generate and transmit a BMS open control signal or a BMS close control signal to the battery contactor.

5. The propulsion system of claim 4, wherein the emergency control signal generated and transmitted to the battery contactor from the emergency actuator in the actuated state controls the battery contactor to switch to the open state with the BMS close control signal applied to the battery contactor by the BMS controller.

6. The propulsion system of claim 1, wherein the engine controller is operable to generate and transmit a motor open control signal or a motor close control signal to the electric motor contactor and, with the electric motor contactor in the closed state, control the motor control unit to supply electrical power from the battery to the electric motor.

7. The propulsion system of claim 6, wherein the emergency control signal generated and transmitted to the electric motor contactor from the emergency actuator in the actuated state controls the electric motor contactor to switch to the open state with the motor close control signal applied to the electric motor contactor by the engine controller.

8. The propulsion system of claim 6, wherein the emergency energy protection assembly further includes a deenergization circuit at the motor control unit, the deenergization circuit is connected in signal communication with the emergency actuator, the deenergization circuit is operable to receive the emergency control signal from the emergency actuator in the actuated state and, in response to receiving the emergency control signal, control the motor control unit to deenergize the electric motor.

9. A propulsion system for an aircraft, the propulsion system comprising:
   an engine including an engine output shaft, a combustor, and a fuel system, the fuel system connected in fluid communication with the combustor, the fuel system including a fuel control unit operable to control fuel flow from the fuel system to the combustor;
   an electrical assembly including a battery, a motor control unit, an electric motor, an electrical distribution system, and a battery management system, the electrical distribution system configured to electrically interconnect the battery and the motor control unit, the electrical distribution system including at least one contactor electrically connected between the battery and the motor control unit, the at least one contactor switchable between a closed state and an open state, the at least one contactor including a battery contactor and an electric motor contactor, the battery contactor electrically connected with and between the battery and the electric motor contactor, the electric motor contactor electrically connected with and between the battery contactor and the motor control unit, the motor control unit electrically connected with the electric motor, the electric motor coupled with the engine output shaft, the battery management system including a battery management system (BMS) controller connected in signal communication with the battery contactor;

an emergency energy protection assembly including a cockpit-actuated emergency actuator, the cockpit-actuated emergency actuator connected in signal communication with the at least one contactor, the motor control unit, and the fuel control unit, the cockpit-actuated emergency actuator actuable from an unactuated state to an actuated state, the emergency actuator in the actuated state operable to generate and transmit an emergency control signal to each of the at least one contactor, the motor control unit, and the fuel control unit to respectively control the at least one contactor to switch to the open state, control the motor control unit to deenergize the electric motor, and control the fuel control unit to stop fuel flow through the fuel system to the combustor; and an engine controller connected in signal communication with the electric motor contactor and the motor control unit.

10. The propulsion system of claim 9, wherein the engine controller is operable to generate and transmit a motor open control signal or a motor close control signal to the electric motor contactor and, with the electric motor contactor in the closed state, control the motor control unit to supply electrical power from the battery to the electric motor.

11. The propulsion system of claim 10, wherein the emergency control signal generated and transmitted to the electric motor contactor from the emergency actuator in the actuated state controls the electric motor contactor to switch to the open state with the motor close control signal applied to the electric motor contactor by the engine controller.

12. The propulsion system of claim 10, wherein the emergency energy protection assembly further includes a deenergization circuit at the motor control unit, the deenergization circuit is connected in signal communication with the emergency actuator, the deenergization circuit is operable to receive the emergency control signal from the emergency actuator in the actuated state and, in response to receiving the emergency control signal, control the motor control unit to deenergize the electric motor.

13. The propulsion system of claim 9, further comprising a mechanical disconnect assembly configured to selectively couple the electric motor with the engine output shaft, wherein the emergency actuator is further connected in signal communication with the mechanical disconnect assembly, and the emergency actuator in the actuated state is operable to further generate and transmit the emergency control signal to the mechanical disconnect assembly to control the mechanical disconnect assembly to decouple the electric motor from the engine output shaft.

14. The propulsion system of claim 13, further comprising a gear box configured to couple the engine output shaft and the electric motor with the engine output shaft, and the mechanical disconnect assembly is configured to selectively couple the electric motor with the gear box.

15. A propulsion system for an aircraft, the propulsion system comprising:

a propulsor;

an engine including a rotational assembly, a gear box, a combustor, and a fuel system, the rotational assembly including a bladed turbine rotor and a shaft connected to the bladed turbine rotor, the shaft coupled with the propulsor by the gear box, the fuel system connected in fluid communication with the combustor, the fuel system including a fuel control unit operable to control fuel flow from the fuel system to the combustor to drive rotation of the rotational assembly;

an electrical assembly including a battery, a motor control unit, an electric motor, an electrical distribution system, and a battery management system, the electrical distribution system configured to electrically interconnect the battery and the motor control unit, the electrical distribution system including at least one contactor electrically connected between the battery and the motor control unit, the at least one contactor switchable between a closed state and an open state, the at least one contactor including a battery contactor and an electric motor contactor, the battery contactor electrically connected with and between the battery and the electric motor contactor, the electric motor contactor electrically connected with and between the battery contactor and the motor control unit, the motor control unit electrically connected with the electric motor, the electric motor coupled with the propulsor, the battery management system including a battery management system (BMS) controller connected in signal communication with the battery contactor;

an emergency energy protection assembly including an emergency actuator, the emergency actuator connected in signal communication with the at least one contactor, the motor control unit, and the fuel control unit, the emergency actuator actuable from an unactuated state to an actuated state, the emergency actuator in the actuated state operable to generate and transmit an emergency control signal to each of the at least one contactor, the motor control unit, and the fuel control unit to respectively control the at least one contactor to switch to the open state, control the motor control unit to deenergize the electric motor, and control the fuel control unit to stop fuel flow through the fuel system to the combustor; and an engine controller connected in signal communication with the electric motor contactor and the motor control unit.

16. The propulsion system of claim 15, further comprising a mechanical disconnect assembly configured to selectively couple the electric motor with the gear box, wherein the emergency actuator is further connected in signal communication with the mechanical disconnect assembly, and the emergency actuator in the actuated state is operable to further generate and transmit the emergency control signal to the mechanical disconnect assembly to control the mechanical disconnect assembly to decouple the electric motor from the gear box.

17. The propulsion system of claim 15, wherein the BMS controller is operable to generate and transmit a BMS open control signal or a BMS close control signal to the battery contactor.

18. The propulsion system of claim 15, wherein the engine controller is operable to generate and transmit a motor open control signal or a motor close control signal to the electric motor contactor and, with the electric motor contactor in the closed state, control the motor control unit to supply electrical power from the battery to the electric motor.

19. The propulsion system of claim 18, wherein the emergency energy protection assembly further includes a deenergization circuit at the motor control unit, the deenergization circuit is connected in signal communication with the emergency actuator, the deenergization circuit is operable to receive the emergency control signal from the emergency actuator in the actuated state and, in response to receiving the emergency control signal, control the motor control unit to deenergize the electric motor.

\* \* \* \* \*